United States Patent [19]

Haldeman

[11] 4,455,265

[45] Jun. 19, 1984

[54] STABILIZER FOR LOW AMMONIA NATURAL RUBBER LATEX COMPOUNDS

[75] Inventor: Janice L. Haldeman, Akron, Ohio

[73] Assignee: The Firestone Tire & Rubber Company, Akron, Ohio

[21] Appl. No.: 354,336

[22] Filed: Mar. 3, 1982

[51] Int. Cl.$^3$ .............................................. C08C 1/02
[52] U.S. Cl. .................................. 524/145; 524/140; 524/925
[58] Field of Search ............... 260/739, 740, 709, 819

[56] References Cited

U.S. PATENT DOCUMENTS

| | | | |
|---|---|---|---|
| 1,917,250 | 7/1933 | Harris | 426/604 |
| 1,946,333 | 2/1934 | Rewald | 260/779 |
| 2,587,657 | 3/1952 | Schulte | 260/740 |
| 2,759,975 | 8/1956 | Chiddix | 260/739 |
| 3,046,244 | 7/1962 | Hunter | 260/739 |
| 3,146,273 | 8/1964 | Orloff | 260/739 |
| 4,239,670 | 12/1980 | Moorman | 260/739 |

*Primary Examiner*—C. A. Henderson
*Attorney, Agent, or Firm*—Frank J. Troy, Sr.

[57] ABSTRACT

The chemical stability of low ammonia natural rubber latices and latex compounds is improved by the addition of from 0.1 to 0.5 parts by weight solids, per 100 parts by weight of natural rubber solids, of a neutralized or partially neutralized anionic phosphate surfactant having a pH in a 20 percent aqueous solution of from 4 to 12. The resultant stabilized natural rubber latices or latex compounds are particularly suitable for use in preparing prevulcanized dipping compounds.

10 Claims, No Drawings

STABILIZER FOR LOW AMMONIA NATURAL RUBBER LATEX COMPOUNDS

BACKGROUND OF THE INVENTION

The invention relates to a stabilizer for low ammonia natural rubber latices and latex compounds. More particularly, the invention relates to a method for improving the chemical stability of low ammonia natural rubber latices and latex compounds by the addition of a particular anionic phosphate surfactant which has been neutralized or partially neutralized to a pH of from 4 to 12 as measured in a 20 percent aqueous solution.

Natural rubber latices are used in a number of important applications such as, for example, prevulcanized dipping compounds, foams and molding compounds. Such latices are conventionally produced as concentrates by well known centrifuging or creaming processes. The latices are preserved or protected against bacterial attack by the addition of ammonia. Commercially available natural rubber latices are generally classified into two principal types. These are the so-called high ammonia (HA) types which generally contain 0.6 percent by weight or more of ammonia based on total weight of latex and the low ammonia (LA) types which generally contain 0.3 percent by weight or less of ammonia based on total weight of latex. In addition, the low ammonia types generally contain auxiliary preservatives such as zinc oxide, dithiocarbamates and thiuram disulfides.

High ammonia natural rubber latices are widely used in prevulcanized dipping compounds. However, such latices suffer from significant disadvantages. Thus, the high ammonia natural rubber latices upon drying liberate ammonia fumes to the atmosphere thereby contributing to environmental air pollution problems. In view of increasingly stringent air pollution standards, those active in the latex field have sought to limit the emission of ammonia fumes to the atmosphere. The most common approach to this problem has been to deammoniate the latex with formaldehyde. However, this approach not only adds to compounding costs but formaldehyde itself also contributes to environmental pollution problems.

In view of the foregoing, those active in the natural rubber latex field have devoted increasing effort to the development of low ammonia natural rubber latices. However, the low ammonia natural rubber latices also exhibit certain significant disadvantages which materially limit their usefulness in certain applications. Thus, for example, an important disadvantage of using such latices in the preparation of prevulcanized dipping compounds is that the resultant compound often lacks the necessary chemical stability to withstand prevulcanization conditions. This lack of chemical stability often results in gelation or coagulation of the latex compound during prevulcanization.

The lower than desirable chemical stability of low ammonia natural rubber latices in such applications is apparently related to the fact that such latices have a higher $NH_4^+/NH_3$ ratio than the high ammonia type latices. This leads to the formation of the lower order $[Zn(NH_4)_n]^{++}$ complex ions wherein n is 1 or 2 instead of 3 or 4. It is believed that under certain conditions, these zinc ammonia complex ions react with fatty acid soaps absorbed on the rubber particles to form insoluble zinc soaps. The resultant zinc soaps then apparently cause the latex to coagulate or gel.

Several approaches for improving the chemical stability of low ammonia natural rubber latices have been described or suggested in the prior art.

Early approaches to the problem involved a procedure intended to prevent the formation of insoluble zinc soaps by preventing the formation of the lower order $[Zn(NH_4)_n]^{++}$ complex ion wherein n is 1 or 2. In general, this was accomplished by adding KOH to the latex in sufficient amount to raise the pH of the latex to about 10 or more. The higher pH level of the latex tends to favor the formation of the less reactive higher order complex where n is 3 or 4. However, this approach has not achieved wide acceptance by users of natural rubber latices due to either inconvenience or actual or perceived difficulty in making such adjustments.

More recently, the prior art has suggested that the chemical stability of low ammonia natural rubber latices can be improved by utilizing certain anionic or non-ionic surfactants as stabilizers. However, it has been found that many anionic or non-ionic surfactants either do not provide sufficiently improved chemical stability, particularly in applications where severe processing conditions are encountered such as in the preparation of prevulcanized dip compounds or they adversely affect other properties of the compound such as dipping sensitivity, gel strength and the like.

Accordingly, those active in the natural rubber latex field are constantly seeking a method for improving the chemical stability of low ammonia natural rubber latices which does not involve complex compounding adjustments or the use of a stabilizer which with adversely affects other important properties of such latices or latex compounds.

SUMMARY OF THE INVENTION

In accordance with the present invention, a method of improving the chemical stability of low ammonia natural rubber latices and latex compounds which does not adversely affect other desirable properties of the latex or latex compound is provided.

The method involves the addition to the latex or latex compound of from about 0.1 to about 0.5 parts by weight solids per 100 parts by weight of natural rubber solids of a particular neutralized or partially neutralized anionic phosphate surfactant having a pH after neutralization of from 4 to 12 as measured in a 20 percent aqueous solution. The resultant low ammonia natural rubber latex or latex compound exhibits excellent chemical stability and is particularly suitable for use in the preparation of prevulcanized dipping compounds. In addition, suitable foam and molding compounds can be prepared utilizing the low ammonia natural rubber latex and surfactant.

DETAILED DESCRIPTION OF THE INVENTION

Low ammonia natural rubber latices to which the method of the invention is generally applicable are those having solids contents of from 60 to 70 percent by weight, ammonia levels of 0.3 percent by weight or less based on total weight of latex, pH's of from about 9 to about 10 and KOH numbers of from about 0.4 to about 0.8. A particularly preferred latex of the above type is one designated Hartex®103 which is commercially available from The Firestone Tire & Rubber Company. This latex has a solids content from 61.8 to 62.4 percent by weight, an ammonia level of from 0.15 to 0.23 percent by weight based on total weight of latex, a KOH number of from 0.48 to 0.70 and a pH of from about 9.3 to 9.9.

As indicated above, the chemical stability of low ammonia natural rubber latices of the above type is improved in accordance with the method of this invention by the addition thereto of from 0.1 to 0.5, preferably 0.25 parts by weight solids per 100 parts by weight of natural rubber solids of a particular neutralized or partially neutralized anionic phosphate surfactant having a pH after neutralization of from 4 to 12, preferably 7, as measured in a 20 percent aqueous solution.

The particular anionic phosphate surfactant which is employed in neutralized or partially neutralized form in the method of the invention is a surfactant designated Triton®QS-44 which is commercially available from the Rohm and Haas Company. This surfactant in its original form (i.e., prior to neutralization) is identified as the free acid form of an anionic phosphate surfactant at 80 percent solids in aqueous solution having a Brookfield viscosity at 25° C. of 8,000 centipoises, a Pour Point of 35° F., a specific gravity at 25° C. at 1.18 and a pH of 1.3 to 2.0 as measured in a 5 percent aqueous solution.

Prior to neutralizing the original surfactant for use in the method of the invention, it is diluted with water from its original 80 percent solids aqueous solution to a 20 percent solids aqueous solution in order to facilitate mixing it into the latex. Then, as indicated, the surfactant solution is neutralized or partially neutralized to a pH of from 4.0 to 12.0 as measured in 20 percent solids aqueous solution utilizing an appropriate base, preferably KOH. The resultant neutralized or partially neutralized anionic phosphate surfactant solution is then added to the low ammonia natural rubber latex using conventional mixing procedures.

In addition to the above described surfactant stabilizer, various well known special purpose additives may be added to the low ammonia natural rubber latex to form compounds having particular utility as prevulcanized dip compounds. Thus, for example, special purpose additives such as antioxidants, curing agents, curing accelerators and the like can be added to the latex to produce prevulcanized dip compounds.

The following examples are submitted for the purpose of further illustrating the nature of the present invention and are not intended as a limitation on the scope thereof. Parts and percentages referred to in the examples are by weight unless otherwise indicated.

EXAMPLES A-R

These Examples are the result of screening tests in which various anionic and non-ionic surfactants were evaluated in a natural rubber latex based compound intended for use as a prevulcanized dip compound. In Example A, a high ammonia latex designated Hartex®104 was employed as a control. Hartex®104 is a high ammonia latex available from The Firestone Tire & Rubber Company having a solids content of 62.1±0.3 percent by weight, an ammonia content of 0.71±0.04 based on total latex weight, a KOH number of 0.55±0.05 and a pH of 10.4. In Examples B-R, which served as the test compounds, Hartex®103 a low ammonia natural rubber latex (defined above) was employed in the compounds. The standard compound had the following formulation:

| Ingredients | Parts by Weight Solids per 100 Parts Natural Rubber Solids |
|---|---|
| Natural rubber latex (62% aqueous solution) | 100.0 |
| Surfactant (20% aqueous solution) | 0.5 |
| KOH[1] (17% aqueous solution) | 0.4 |
| Santowhite Powder[2] (50% aqueous dispersion) | 1.0 |
| Sulfur[3] (68% aqueous dispersion) | 0.5 |
| Methyl Zimate[4] (25% aqueous dispersion) | 0.15 |
| Zetax[5] (50% aqueous dispersion) | 0.20 |
| Zinc oxide[6] 50% aqueous dispersion) | 1.00 |

[1] added to reduce KOH number of latex to 0.12
[2] 4,4'-butylidene bis(6-tertiary butyl meta cresol), antioxidant
[3] curing agent
[4] zinc dimethyl dithiocarbamate - curing accelerator
[5] zinc 2-mercaptobenzothiazole - curing accelerator
[6] curing agent
Santowhite is a registered trademark of the Monsanto Co.
Methyl Zimate and Zetax are registered trademarks of the R. T. Vanderbilt Co., Inc.

In preparing the various test compounds, the above ingredients were mixed together using conventional latex mixing techniques. Water was then added to the compound in a sufficient amount to achieve a total solids content of about 60.0 percent by weight.

In order to determine the effect of the various surfactants on the stability of the natural rubber latex and correspondingly the finished compounds, all of the compounds were subjected to a precure at 82° C. for 2 hours and the effects on stability during precure, changes in viscosity and dipping sensitivity were observed. In this screening evaluation, the chemical stability imparted by the various surfactants were rated as being excellent if the test compound did not coagulate during precure and exhibited viscosities and dipping sensitivities which were comparable to the control. If the compounds coagulated during precure or exhibited excessively high viscosities or low dipping sensitivities as compared to the control, the surfactant was rated as having failed to improve chemical stability.

The type natural rubber latex, the nature and type of surfactants tested, and effects on chemical stability are shown in Table I.

TABLE I

| Example | Type NR latex | Surfactant | Stability to Precure at 82° C. for 2 hours |
|---|---|---|---|
| A (control) | Hartex(R)104(HA) | Nekal BA-77 - sodium alkylnaphthalene sulfonate - A | Excellent |
| B | Hartex(R)103(LA) | Triton(R)QS-44 in 20% aqueous solution* - A | Excellent |
| C | " | Sodium salt of amphoteric surfactant - A | Failed - Y |
| D | " | Phosphate ester, acid form** - A | Failed - Z |
| E | " | Dioctyl sodium sulfosuccinate - A | Failed - Z |

TABLE I-continued

| Example | Type NR latex | Surfactant | Stability to Precure at 82° C. for 2 hours |
|---|---|---|---|
| F | " | Sodium salt of alkyl aryl polyether sulfonate (2) - A | Failed - Y |
| G | " | Sodium salt of alkyl aryl polyether sulfate - A | Failed - Y |
| H | " | Octylphenoxy polyethoxy ethanol (2) - N | Failed - Y |
| I | " | Octylphenoxy poly(ethyleneoxy) ethanol - N | Failed - Y |
| J | " | Nonylphenoxy poly(ethyleneoxy) ethanol (2) - N | Failed - Y |
| K | " | Dialkylphenoxy poly(ethyleneoxy) ethanol - N | Failed - Y |
| L | " | Sodium N—methyl-N—oleoyl taurate - A | Failed - Z |
| M | " | Sodium N—coconut acid-N—methyl taurate - A | Failed - Y |
| N | " | Sodium N—methyl-N—Tall oil acid taurate - A | Failed - Y |
| O | " | Ammonium salt of sulfated nonylphenoxy poly(ethyleneoxy) ethanol (3) - A | Failed - Y |
| P | " | Sodium alkylnaphthalene sulfonate (2) - A | Failed - Y |
| Q | " | Sodium lauryl sulfate - A | Failed - Y |
| R | " | Sulfonated fatty product - A | Failed - Y |

*Free acid form of anionic phosphate - required very careful and thorough mixing to prevent coagulation
**Triton$^{(R)}$QS-30 an anionic phosphate ester in free acid form which differs from Triton$^{(R)}$QS-44
Note:
The numbers in parenthesis represent tests of surfactants having the same chemical structure available from different manufacturers.
Nekal is a registered trademark of the GAF Corporation.
Failed - Y means that the compound coagulated during precure.
Failed - Z means that the compound either coagulated or exhibited unsatisfactory viscosity and dipping sensitivity.
A - means anionic
N - means non-ionic As indicated above, only certain anionic and nonionic surfactants provide adequate chemical stability to low ammonia natural rubber latices utilized in prevulcanized dip compounds. In this particular screening test, only Triton ®QS-44 provided excellent stability to Hartex ®103 low ammonia natural rubber latex. The other surfactants tested failed to provide adequate chemical stability during prevulcanization.

The following Examples (i.e., 1-2) illustrate the effect of neutralizing the Triton ®QS-44 anionic phosphate surfactant solution on the chemical stability of the standard prevulcanized dip compound.

EXAMPLE 1-2

In these Examples, the standard prevulcanized dip compound formulation of Examples A-R was employed. In the test compounds, i.e., Examples 1 and 2, Hartex ®103 low ammonia natural rubber latex was utilized and the original Triton ®QS-44 surfactant at a 20% solids aqueous solution was neutralized with KOH and ammonium hydroxide respectively. For comparative purposes, two controls were included in the evaluation. The first control utilized the high ammonia (HA) natural rubber latex Hartex ®104 along with 0.25 parts by weight solids per 100 parts by weight solids of natural rubber latex of Nekal BA-77 surfactant. The second control utilized Hartex ®103 low ammonia (LA) natural rubber latex and un-neutralized Triton ®QS-44 surfactant at 20% solids aqueous solution.

After preparing the compound formulations, the compounds were tested for initial properties and then subjected to prevulcanization, and viscosities were then measured to determine the effect of neutralization on chemical stability. The compound variations, degree of neutralization and physical properties before and after prevulcanization are shown in Table II.

TABLE II

| Example No. | Control | Control | 1 | 2 |
|---|---|---|---|---|
| Latex | Hartex$^{(R)}$ 104(HA) | Hartex$^{(R)}$ 103(LA) | Hartex$^{(R)}$ 103(LA) | Hartex$^{(R)}$ 103(LA) |
| Surfactant | | | | |
| Type | Nekal BA-77 | Triton QS-44 | Triton QS-44 | Triton QS-44 |
| Solution | | 20% in H$_2$O | 20% in H$_2$O | 20% in H$_2$O |
| Amount | 0.25 phr$^1$ | 0.5 phr | 0.5 phr | 0.5 phr |
| Neutralization | none | none | KOH$^2$ | NH$_4$OH$^3$ |
| Initial Properties | | | | |
| Compound pH | 10.53 | 10.49 | 10.80 | 10.61 |
| Brookfield Viscosity #2 at 25° C., 60 RPM (cps) | 61 | 76 | 67 | 75 |
| Zahn Viscosity #2 (sec) | 21.0 | 22.2 | 21.5 | 22.7 |
| Properties After Prevulcanization for 2 hrs. at 80° C. | | | | |
| Compound pH | 10.26 | 10.36 | 10.55 | 10.42 |
| Brookfield Viscosity #2 at 25° C., 60 RPM (cps) | 173 | 123 | 90 | 129 |
| Zahn Viscosity #2 (sec) | 30.6 | 26.3 | 24.4 | 27.4 |

$^1$parts by weight solids per 100 parts by weight solids natural rubber
$^2$pH of neutralized surfactant solution was 7.24
$^3$pH of neutralized surfactant solution was 7.0
cps means centipoises
secs means seconds The above data indicates that the neutralized Triton ®QS-44 anionic phosphate surfactant provides excellent stability during severe prevulcanization conditions.

The following Examples (i.e., 3-5) illustrate the effect of the levels of neutralized Triton ®QS-44 anionic phosphate surfactant solution on the viscosity properties of a prevulcanized dip compound.

EXAMPLES 3-5

In these Examples, the standard dip compound formulation of Examples A-R was employed with the exception that the natural rubber latex utilized was Hartex ®103 a low ammonia natural rubber latex, the original Triton ®QS-44 surfactant at 20% solids aqueous solution was neutralized with KOH and varying levels of surfactant were employed. The viscosity of the test compounds were determined before and after prevulcanization. The surfactant levels and viscosity properties are shown in Table III.

TABLE III

| Example No. | 3 | 4 | 5 |
|---|---|---|---|
| KOH neutralized QS-44 | | | |
| amount | 0.5 phr | 0.25 phr | 0.1 phr |
| pH | 7.24 | 7.24 | 7.24 |
| Viscosity Properties | | | |
| Initial | | | |
| compound pH | 10.89 | 10.81 | 10.78 |
| Brookfield Viscosity #2 at 25° C., 60 RPM (cps) | 80 | 78 | 76 |
| Zahn #2 (secs) | 21.8 | 21.1 | 22.0 |
| After Prevulcanization for 2 hours at 82° C. | | | |
| compound pH | 10.51 | 10.60 | 10.58 |
| Brookfield Viscosity #2 at 20° C., 60 RPM (cps) | 146 | 122 | 140 |
| Zahn #2 (secs) | 26.7 | 26.1 | 26.6 |

The above data indicates that at the 0.1 to 0.5 parts by weight per 100 parts by weight of natural rubber levels, the prevulcanized compounds exhibit excellent viscosities.

In addition to evaluating the effect of varying levels of neutralized Triton ®QS-44 on viscosity, the above Examples were also tested for their effect on dipping sensitivity. In this evaluation, a control formulation using Hartex ®104 high ammonia natural rubber latex along with 0.25 phr of Nekal BA-77 surfactant was utilized as a control. Test results are shown in Table IV.

TABLE IV

| Example No. | Control | 3 | 4 | 5 |
|---|---|---|---|---|
| Gel set time (secs) | 17 | 17 | 15 | 15 |
| Dipped film gauge (mil) | 13 | 13 | 13 | 13.5 |
| Gel strength | strong | strong | strong | strong |

In the above evaluation, the compounds were coagulant dipped using CaCl$_2$Ca(NO$_3$)$_2$ at 30% in alcohol on glass plates. The glass plates were dipped at 10 inches per minute, 15 second dwell time at room temperature.

The above data indicates that the anionic surfactant employed to chemically stabilize the prevulcanized dip compound did not adversely affect dipping sensitivity.

The following Examples (i.e., 6-9) illustrate the effect of the pH of the neutralized Triton ®QS-44 surfactant on the stability of prevulcanized dip compounds.

EXAMPLES 6-9

In these Examples, the test compounds were formulated using the standard dip compounds formula of Examples A-R. The Triton ®QS-44 was then neutralized to various pH levels using KOH. In addition, a control formulation was included in which the natural rubber latex employed was Hartex ®104 high ammonia latex. In the control formulation, Nekal BA-77 surfactant was used at the 0.25 phr level. The compounds were then tested for initial viscosity properties and viscosity properties after prevulcanization. Compound variations and test results are shown in Table V.

TABLE V

| Example No. | Control | 6 | 7 | 8 | 9 |
|---|---|---|---|---|---|
| Latex | Hartex$^{(R)}$ 104 | Hartex$^{(R)}$ 103 | Hartex$^{(R)}$ 103 | Hartex$^{(R)}$ 103 | Hartex$^{(R)}$ 103 |
| Surfactant | Nekal BA-77 | Triton$^{(R)}$ QS-44 | Triton$^{(R)}$ QS-44 | Triton$^{(R)}$ QS-44 | Triton$^{(R)}$ QS-44 |
| Amount/solids wt. | 0.25 | 0.25 | 0.25 | 0.25 | 0.25 |
| pH after neutralization | — | 4.34 | 6.06 | 10.20 | 12.62 |
| Initial Compound Properties | | | | | |
| pH | 10.57 | 10.94 | 10.91 | 10.88 | 11.00 |
| Brookfield Viscosity #2 at 25° C., 60 RPM (cps) | 62 | 62 | 60 | 62 | 66 |
| Zahn #2 (secs) | 21.5 | 21.4 | 21.2 | 21.5 | 22.2 |
| Compound Properties fter 2 hrs. Prevulcanization at 82° C., | | | | | |
| pH | 10.41 | 10.76 | 10.67 | 10.70 | 10.76 |
| Brookfield Viscosity #2 at 25° C., 60 RPM (cps) | 158 | 130 | 127 | 129 | 152 |
| Zahn #2 (secs) | 31.0 | 31.0 | 29.2 | 30.9 | 33.9 |

The above data indicates that the neutralized surfactants at the pH's shown produced dip compounds having chemical stabilities which are comparable to the high ammonia natural rubber latex based control compound.

The following Examples (i.e., Examples 10-14) illustrate that the chemical stability of low ammonia natural rubber latices stored for various periods of time can be improved by the addition of neutralized Triton ®QS-44 surfactant in accordance with the method of the invention.

EXAMPLES 10-14

In these Examples, Hartex ®103 low ammonia natural rubber latex samples from lots of latex which had been stored for various periods of time were formulated into compounds for use as prevulcanized dip compounds using the standard formulation of Examples A-R. Triton ®QS-44 surfactant solution at 20 percent solids in aqueous solution was neutralized with KOH and added to the formulation as the surfactant stabilizer. In the evaluation, a control compound utilizing unaged Hartex ®104 high ammonia natural rubber latex and 0.25 Nekal BA-77 surfactant was included for comparative purposes. The control and test compounds were tested for viscosity properties both initially and after prevulcanization.

Compound variations and test results are shown in Table VI.

TABLE VI

| Example | Control | 10 | 11 | 12 | 13 | 14 |
|---|---|---|---|---|---|---|
| Latex | | | | | | |
| Age, months | — | 3 | 8 | 4 | 2 | 4 |
| KOH No. | 0.61 | 0.56 | 0.81[1] | 0.57 | 0.54 | 0.60 |
| Surfactant solution[2] | | | | | | |
| amount, phr | 0.25 | 0.25 | 0.25 | 0.25 | 0.25 | 0.25 |
| pH[3] | — | 7.24 | 7.24 | 7.24 | 7.24 | 7.24 |
| Initial compound properties | | | | | | |
| pH | 10.53 | 10.95 | 10.82 | 10.96 | 10.89 | 10.99 |
| Brookfield Viscosity #2 at 25° C., 60 RPM (cps) | 61 | 62 | 80 | 62 | 62 | 74 |
| Zahn #2 (secs) | 21.0 | 21.7 | 23.4 | 22.2 | 22.3 | 23.8 |
| Compound Properties after 2 hr. prevulcanization at 80° C. | | | | | | |
| pH | 10.26 | 10.83 | 10.68 | 10.74 | 10.68 | 10.92 |
| Brookfield Viscosity #2 at 25° C., 60 RPM (cps) | 173 | 136 | 250 | 107 | 113 | 123 |
| Zahn #2 (secs) | 30.6 | 32.6 | 43.6 | 27.4 | 28.0 | 27.4 |

[1]this latex had a high KOH number which is not typical of commercial low ammonia natural rubber latices. At this KOH number, it would be expected that the stability of the latex would be insufficient to prevent coagulation during prevulcanization. However, the compound did not coagulate which illustrates the effectiveness of the surfactant in improving the chemical stability of the latex compound.
[2]In Examples 10-14, the surfactant was in the form of a 20 percent aqueous solution.
[3]pH after neutralization of surfactant solution with KOH.

What is claimed is:

1. A method of improving the chemical stability of a low ammonia natural rubber latex which comprises adding from about 0.1 to about 0.5 parts by weight solids per 100 parts by weight of natural rubber solids of a neutralized or partially neutralized anionic phosphate surfactant having a pH of from about 4.0 to about 12.0 in a 20 percent aqueous solution, wherein said surfactant is neutralized with KOH or NH4OH and wherein prior to neutralization said surfactant at an 80 percent solids aqueous solution had a Brookfield viscosity at 25° C. of 8,000 centipoises, a specific gravity at 25° C. of 1.18, a pour point of 35° F. and a pH as measured in a 5 percent aqueous solution of 1.3 to 2.0.

2. The method of claim 1 wherein said low ammonia natural rubber latex has a solids content of from 60 to 70 percent by weight, an ammonia level of 0.3 percent by weight or less based on total weight of latex, a KOH number of from 0.4 to 0.8 and a pH of from 9.0 to 10.0.

3. The method of claim 1 wherein the low ammonia natural rubber latex has a solids content of from 61.8 to 62.4 percent by weight, an ammonia level of from 0.15 to 0.23 percent by weight based on total weight of latex, a KOH number of from 0.48 to 0.70 and a pH of from 9.3 to 9.9.

4. The method of claim 1 wherein 0.25 parts by weight solids per 100 parts by weight of natural rubber solids of said surfactant is added to said latex.

5. The method of claim 1 wherein said neutralized anionic phosphate surfactant has a pH of 7.0.

6. A method of improving the chemical stability of a low ammonia natural rubber latex based prevulcanized dipping compound which comprises adding to said compound from about 0.1 to about 0.5 parts by weight solids per 100 parts by weight of natural rubber solids of a neutralized or partially neutralized anionic phosphate surfactant having a pH of from about 4.0 to about 12.0 in a 20 percent aqueous solution, wherein said surfactant is neutralized with KOH or NH4OH and wherein prior to neutralization, said surfactant at an 80 percent solids aqueous solution had a Brookfield viscosity at 25° C. of 8,000 centipoises, a specific gravity at 25° C. of 1.18, a pour point of 35° F. and a pH as measured in a 5 percent aqueous solution of 1.3 to 2.0.

7. The method of claim 6 wherein said low ammonia natural rubber latex has a solids content of from 60 to 70 percent by weight, an ammonia level of 0.3 percent by weight or less based on total weight of latex, a KOH number of from 0.4 to 0.8 and a pH of from 9.0 to 10.0.

8. The method of claim 6 wherein the low ammonia natural rubber latex has a solids content of from 61.8 to 62.4 percent by weight, an ammonia level of from 0.15 to 0.23 percent by weight based on total weight of latex, a KOH number of from 0.48 to 0.70 and a pH of from 9.3 to 9.9.

9. The method of claim 6 wherein 0.25 parts by weight solids per 100 parts by weight of natural rubber solids of said surfactant is added to said compound.

10. The method of claim 6 wherein said neutralized anionic phosphate surfactant has a pH of 7.0.

* * * * *

UNITED STATES PATENT AND TRADEMARK OFFICE
CERTIFICATE OF CORRECTION

PATENT NO. : 4,455,265

DATED : JUNE 19, 1984

INVENTOR(S) : JANICE L. HALDEMAN

It is certified that error appears in the above-identified patent and that said Letters Patent are hereby corrected as shown below:

COLUMN 4, LINE 19 OF THE PRINTED PATENT -- ADJACENT TO THE QUANTITY 50%, THE FIGURE "1.0" SHOULD BE MOVED UNDER THE COLUMN HEADING "PARTS BY WEIGHT SOLIDS PER 100 PARTS NATURAL RUBBER SOLIDS."

Signed and Sealed this

Sixth Day of November 1984

[SEAL]

*Attest:*

*Attesting Officer*

GERALD J. MOSSINGHOFF

*Commissioner of Patents and Trademarks*